March 25, 1958 L. BAUMSTARK 2,827,875
POULTRY CAGE HAVING AN AUTOMATIC EGG COUNTING MECHANISM
Filed Aug. 13, 1956 2 Sheets-Sheet 1
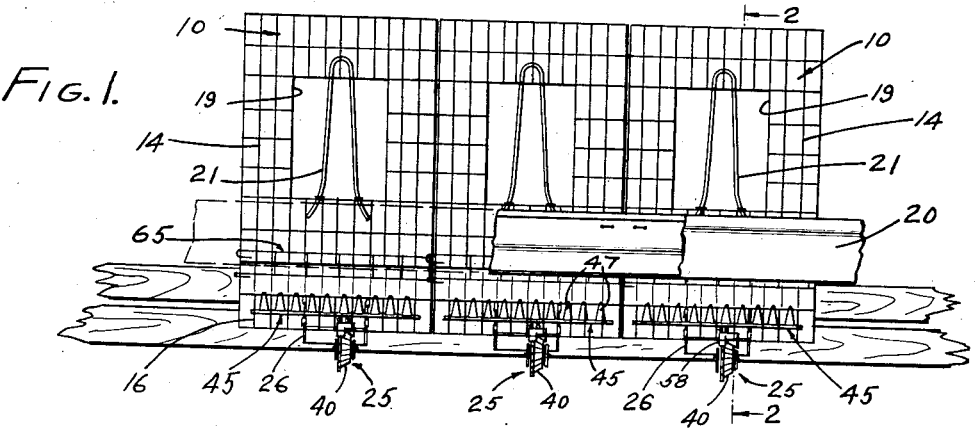
Fig. 1.
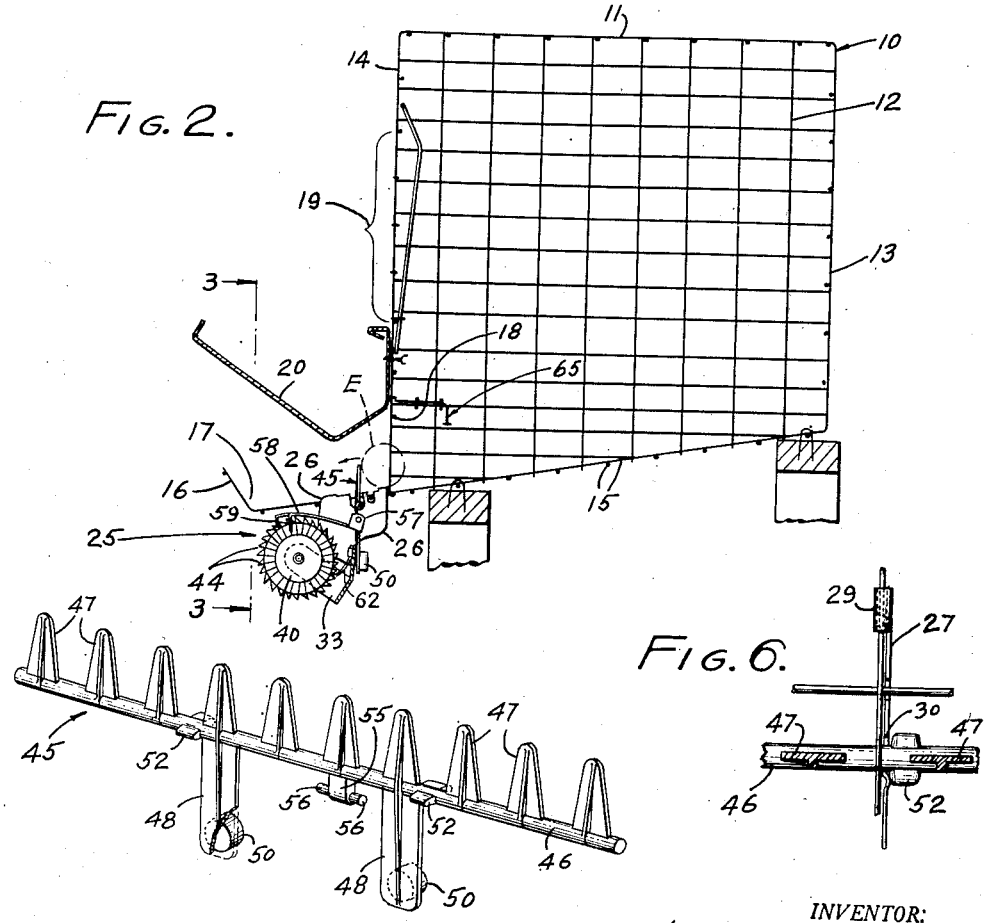
Fig. 2.
Fig. 5.
Fig. 6.
INVENTOR:
LEOPOLD BAUMSTARK
BY March 25, 1958      L. BAUMSTARK      2,827,875
POULTRY CAGE HAVING AN AUTOMATIC EGG COUNTING MECHANISM
Filed Aug. 13, 1956      2 Sheets-Sheet 2
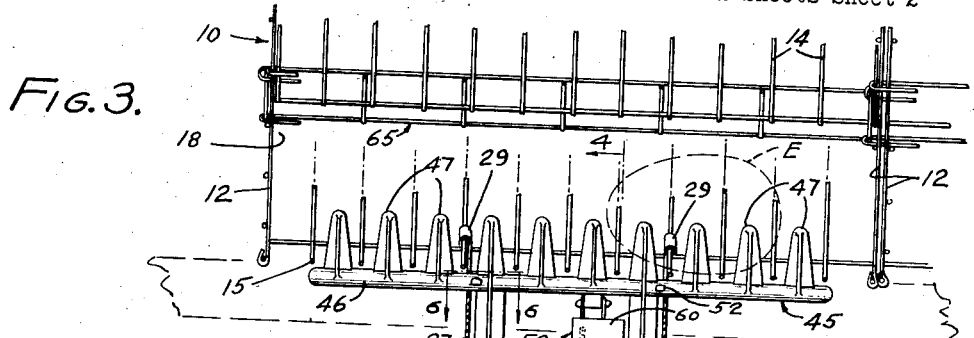
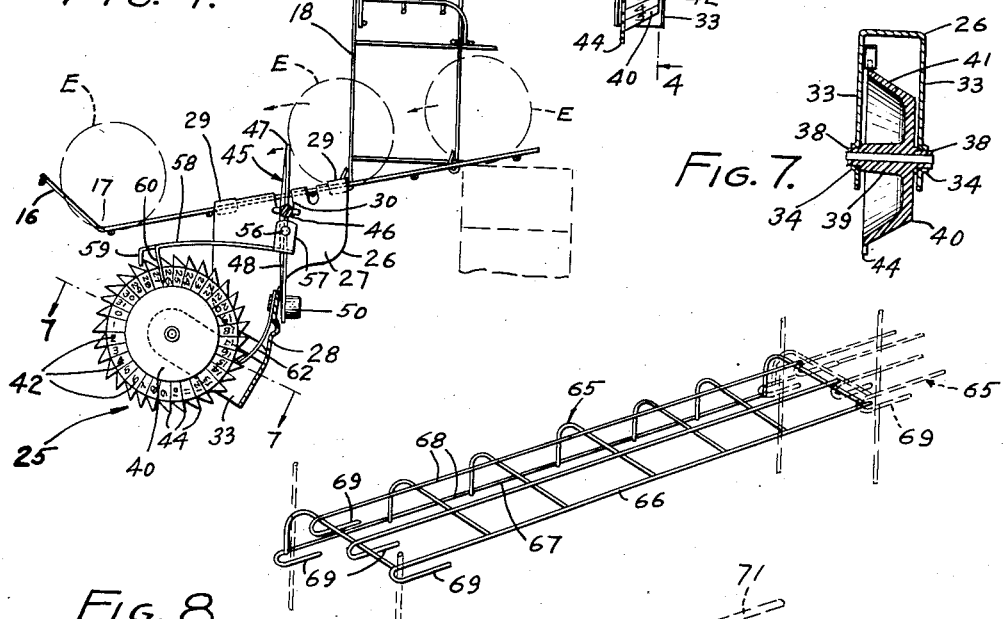
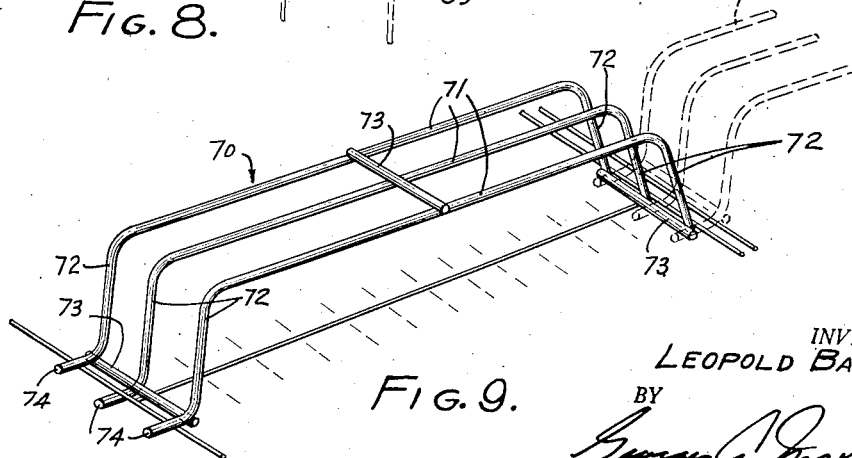
INVENTOR:
LEOPOLD BAUMSTARK

United States Patent Office 2,827,875
Patented Mar. 25, 1958

2,827,875

POULTRY CAGE HAVING AN AUTOMATIC EGG COUNTING MECHANISM

Leopold Baumstark, Los Angeles, Calif.

Application August 13, 1956, Serial No. 603,628

5 Claims. (Cl. 119—48)

This invention relates generally to poultry cage structures in which chickens and fowls are confined and is concerned more particularly with cages for housing laying hens.

It is the present day practice to house poultry in wire cages which are arranged in batteries or rows, each chicken or fowl being kept in a separate cage. In the case of laying hens, the wire cage has a wire net floor which slopes downwardly from one end of the cage to and beyond the other end thereof to terminate in a wire egg trough. By this provision, when the hen lays an egg upon the floor, it rolls slowly down along the gradually sloping floor to come to rest in the egg trough. The eggs thus deposited in the egg troughs of the cages are gathered in containers by an attendant. It is desirable to maintain a close check on the egg output of each hen and, in order to tally the egg production, the attendant records the eggs produced by each hen by marking a production card mounted on the cage. This recording procedure is obviously time-consuming, particularly where several thousand cages must be serviced. In an effort to simplify the procedure and conserve time, it has been proposed to equip each cage with an automatic egg-counting mechanism operative to count each egg as it is delivered to the egg receptacle or trough. One such egg counting mechanism is disclosed in my Patent No. 2,696,349, issued to me December 7, 1954. Said patented counter device includes a shaft extending transversely throughout the full width of the cage and the inclined egg runway or floor, said shaft having a plurality of radial sheet-metal fingers arranged at spaced intervals and adapted to be engaged by the egg rolling from the cage. Such engagement of a finger serves to turn the shaft through a quarter-revolution and a star wheel connected therewith engages successively with the ratchet teeth of a counter wheel or disc to intermittently advance the latter through the distance of one tooth, the disc having numerals on a side face thereof for indicating the number of eggs produced by the hen in the cage. At its opposite face, the disc has indentations, corresponding in number to the ratchet teeth and a spring detent is engageable in these indentations and operative to yieldingly hold the disc in its different positions.

While such an automatic egg counter is quite successful in use, it has been determined that the mechanism is subject to considerable friction which frequently impairs the free rotary motion of the parts so that cracking of an egg is a possibility. Due to the relatively long actuating means, consisting of the shaft and its many fingers, considerable inertia must be overcome to set the mechanism in motion. In addition, it has been found that the counter disc is not easily read by the attendant of the poultry-cage installation.

It is therefore an object of the present invention to provide, in conjunction with a poultry cage, a new and improved automatic egg counter which is positive in action and highly practical and efficient.

Another object of the invention is to provide an automatic egg counter which is quickly mountable at the under side of the sloping floor or ramp by simply hooking it over the longitudinal wires thereof.

Another object of the invention is to provide an egg counter, of the character referred to, which includes a frame, a circumferentially-numbered ratchet wheel, disc or dial intermittently rotatable on the frame, a pawl engageable with circumferential ratchet teeth of the disc and operative to turn the latter through the distance of one tooth as each egg rolls from the cage along the ramp, said pawl being pivotally connected to an oscillating actuating element which, in turn, is pivoted on an axis transversely of the frame. According to the invention, the actuating element resembles an inverted garden rake, having a horizontal bar and vertical tines or fingers which project upwardly through the spaces between the longitudinal wires of the ramp to be engaged by an egg rolling from the cage. Preferably, the oscillating actuating element is a light weight plastic structure and is provided with a small counterweight operative to normally maintain the element in an upright position where its fingers are arranged to be engaged by a downwardly rolling egg, the element being so balanced as to be easily tilted by the egg which rolls over the fingers so as to actuate the pawl and counter disc indexed thereby, said counterweight serving to return the element to its upright position after the egg rolls across the fingers. Also included in the present egg counter structure is a pivoted check pawl or latch which engages successive teeth of the ratchet wheel or disc to prevent retrogressive movement of the latter.

Another object of the invention is to provide an egg counter of the type indicated which, due to the rotary and oscillating movement of its working parts, as distinguished from other devices employing sliding counter scales or bars, is practically proof against getting out of order as a result of food and other matter dropping thereon to clog the mechanism and interfere with the operation of the device.

A further object of the invention is to provide a combined poultry cage and egg counter in which the cage structure has a transverse opening in its egg delivery front portion, said cage embodying a guard element extending across the cage, inwardly of the opening, the guard being so proportioned and located as to preclude the possibility of a hen stretching its neck through the opening to peck at the egg-engaging element of the counter. According to the invention, the guard element may be economically made from crossing wire material and provided with bent hook portions at its ends engageable either with the vertical wires at the sides of the cage or around the longitudinal wires of the cage floor.

Further objects of the invention will appear from the following description and from the drawings which are for the purpose of illustration only, and in which:

Fig. 1 is a front elevational view of a number of hen cages, equipped with the automatic egg counter devices of this invention;

Fig. 2 is an enlarged side elevational view of the same;

Fig. 3 is a further enlarged vertical sectional view, taken on line 3—3 of Fig. 2;

Fig. 4 is a cross-sectional view, taken on line 4—4 of Fig. 3;

Fig. 5 is an enlarged perspective view of the actuating element of the counter device;

Fig. 6 is an enlarged sectional plan view, taken on line 6—6 of Fig. 3;

Fig. 7 is an enlarged cross-sectional view through the counter wheel or disc, taken on line 7—7 of Fig. 4;

Fig. 8 is an enlarged perspective view of a wire guard element employed in the cage in conjunction with the counter device; and Fig. 9 is a perspective view of a guard element of modified form.

Referring to the drawings in detail, the present improved automatic egg counter device is herein illustrated as applied to use with a poultry cage 10 of the type commonly employed for housing laying hens, the cages being shown in multiple, that is, in a row or battery for accommodating several hens.

Each cage 10 is constructed entirely from crossing wire material and has a top 11, sides 12, a back 13, a front panel 14 and a sloping bottom 15 which extends forwardly beyond the front panel to provide, in effect, a ramp which terminates in an upwardly bent portion 16 defining an egg receptacle 17. Directly above the ramp 15, the front panel 14 is provided with a rectangular egg-discharge opening 18. Above this opening is a second, narrower opening 19 through which the hen may extend her neck and head to take food from a sheet metal feed trough 20 extending along the front of the battery of cages. The opening 19 normally is partly closed by the usual, spring wire door or closure 21.

As will be apparent from the foregoing, when a hen housed in the cage 10 lays an egg upon the sloping floor or ramp 15, the egg will roll downwardly along the ramp under the influence of gravity, the egg rolling from the cage through the opening 18 and coming to rest in the trough-like egg receptacle 17 from which it is later taken by the attendant. According to this invention, a counter device 25 is employed for counting the eggs as they roll from the cage, the device being constructed and arranged as next described.

The counter device 25 includes a sheet metal frame 26 of U-shape, having side members or wings 27 and a cross strip 28 (Figs. 3 and 4). At the upper edges of the wings 27 are curved tabs 29 which are adapted to be hooked over longitudinal wires of the ramp 15 to suspend the frame from the latter. Also formed in the upper edges of the wings 27 are slots 30, the bottom rounded edges of which provide spaced bearings for a purpose to be later explained. The cross strip 28 is provided with spaced ears 33 which are established thereon by a suitable backing or forming operation and which project forwardly and upwardly. Adjacent their free ends, these ears have aligned holes and the metal surrounding the holes is flared outwardly (Fig. 7) to provide bearings 34.

Rotatable in the bearings 34 are the opposite reduced ends 38 of the hub 39 of a counter wheel or disc 40. The wheel 40 preferably is molded from plastic material and, as shown in Fig. 7, is of dish shape or frusto-conical in form, having a tapering peripheral surface 41 upon which is imprinted a scale 42 having circumferential divisions and consecutive numbers in these divisions. For example, the divisions and numerals may be from zero to thirty-one, that is, one for each day of a month. The counter wheel 40 is freely rotatable in the bearings 34 and has on its periphery a plurality of circumferentially-spaced, pointed ratchet teeth 44, corresponding in number to the divisions on the scale 42.

The counter device 25 also includes an elongate actuating element 45, preferably produced as a light-weight plastic molding. As shown best in Fig. 5, the element 45 consists of a circular rod 46 provided with a plurality of spaced, upwardly projecting tines or fingers 47. Depending from the rod portion 46 is a pair of projections or ears 48 which carry small counterweight discs 50 at the lower ends.

The actuating element 45 is mounted for oscillation on the frame 26 with its rod portion 46 turnable in the bearings formed by the slots 30 in the frame 26. In order to retain the element 45 against axial movement, its rod 46 is provided with lugs 52 which are so located that they will engage against the inside of the wings 27 of the frame to prevent such movement.

As shown in the drawings, the fingers 47 of the actuating element 45 project upwardly through spaces in the wire ramp 15, in position to be engaged by an egg E rolling along the ramp from the cage to the egg trough 17. Due to the counterweights 50, the element 45 is normally maintained in this position. However, when the egg strikes one of the fingers 47 it acts to tilt the element with the fingers rocking forwardly to allow the egg to roll thereover, after which the weights 50 function to restore the element to its initial position.

Depending from the rod portion 46 of the element 45 is a lug 55 having laterally projecting pintles 56 at its sides. Pivoted on these pintles are the ears 57 of a sheet metal indexing pawl 58 which projects forwardly from the element with its outer free end provided with a lip 59 overlying the periphery of the counter wheel 40. The lip 59 is adapted to engage successively with the ratchet teeth 44 of the wheel as the element 45 is oscillated and during each forward pivotal movement of the element the pawl indexes the wheel through the circumferential distance of one tooth. The pawl 58 is provided with a downwardly bent ear or pointer 60 which serves as an index registrable with the numerals of the scale 42.

Secured to the cross strip 28 of the frame 26 is one end of a check-pawl 62 which, as shown, is simply a curved strip of spring metal. The free end of the pawl 62 is flexed against the periphery of the counter wheel to cause it to engage successively in the spaces between the ratchet teeth 44. Thus, the spring pawl 62 functions to prevent reverse or retrogressive rotation of the counter wheel 40.

With the counter device 25 mounted on the cage 10 as shown in the drawings, its wheel 40 is set at zero. That is, its wheel 40 is rotated manually in clockwise direction, as viewed in Fig. 4, until the pawl 59 engages the "0" ratchet tooth. When the hen housed in the cage 10 lays an egg E upon the inclined floor, the egg rolls forwardly as indicated by the broken lines in Fig. 4. As the egg rolls through the opening 18, it strikes one or more of the upstanding fingers 47 and pivots the same forwardly and downwardly. At the same time, the pawl 58 is drawn rearwardly to index the counter wheel 40 through a distance equal to one tooth.

After the egg E passes across the actuating element 45, the weights 50 act to pivot the element back to its initial position in readiness to be tripped by the next laid egg. During this return movement, the pawl 58 is moved forwardly to engage the next ratchet tooth, at which time its pointer 60 registers with the mark "1," thus indicating that one egg has been laid. The counter device 25 operates as explained above in response to the delivery of each egg from the cage. Thus, the egg production of the hen is recorded and may be ascertained at any time by observing the mark on the wheel 40 indicated by the pointer 60.

It will be observed from the foregoing that the present invention provides a highly practical and efficient egg counting device which is positive in action. The device is composed of simple parts which are adapted for economical mass production as sheet metal stampings and plastic moldings so as to maintain the selling price at a minimum. The device is conveniently installable on the poultry cage without the use of screws or other fastening means and without the use of tools. The parts are very light in weight so that the movable elements are easily actuated by the eggs. However, the counterweights afford sufficient resistance to lightly brake the rolling movement of the egg so as to slow the latter to a speed which insures against breaking the egg as it rolls into the egg trough.

Referring to Figs. 2 and 4, it will be seen that the egg-engaging fingers 47 are located adjacent the opening 18 of the cage 10. In order to prevent the hen from reaching through this opening and pecking at the fingers to actuate the counter, the invention contemplates the provision of a guard 65. The guard element 65 consists of a strip of wire mesh material which is bent longitudinally to provide a horizontal portion 66 and a depending edge portion 67. At one end, the longitudinal wires 68 are bent to provide hooks 69. The guard element 65 is inserted into the cage 10 to extend thereacross at a level slightly above the opening 18. The hooks 69 are engaged around the horizontal and vertical wires of a side 12 of the cage. The other plain end of the guard element 65 is held in place by the hooks 69 of the guard element 65 disposed in the next adjacent cage, as indicated by the broken lines in Fig. 8. By means of the guard 65, the hen is prevented from reaching through the opening 18 to actuate the counter device.

In lieu of the guard element 65, a guard element 70 of the type disclosed in Fig. 9 may be employed. The guard 70 consists of several bars 71 which have downwardly bent ends 72, the bars and ends being joined by cross bars 73. At one end, the portions 72 have horizontal extensions of hooks 74 adapted to engage over and under a longitudinal wire of the cage bottom 15 as shown in Fig. 9. The cross bar 73 at the other end of the guard element is engaged by the hooks 74 of the guard element installed in the next adjacent cage as indicated by the broken lines in Fig. 9.

In accordance with the provision of the patent statutes, I have herein described the principle of the invention together with the counter structure which I now consider to represent the best embodiment of the invention. I wish to have it understood, however, that various modifications might be made in the construction and arrangement of the parts without departing from the spirit or scope of the invention as defined in the appended claims.

I claim as my invention:

1. An egg counter device for use in connection with a wire poultry cage having a sloping wire ramp providing the bottom of the cage and terminating in an egg gathering trough, comprising: a frame attachable to the wire ramp to be disposed at the underside thereof; a counter wheel rotatable on said frame on an axis extending transversely of the ramp, said wheel being disposed wholly beneath the ramp and having at its periphery ratchet teeth and graduating numbers denoting the number of eggs counted; an elongate actuating element pivoted on said frame on an axis extending parallel to said axis of said wheel, said element having integral fingers projecting upwardly through the wire ramp at intervals spaced transversely of the ramp, in position to be engaged and rocked by an egg rolling along the ramp; indexing pawl means pivotally connected to said actuating element and engageable successively with the teeth of the disc during oscillation of the element for intermittently rotating the latter through the circumferential distance of one tooth; a check pawl mounted on said frame and engageable successively with said ratchet teeth to prevent retrogressive movement of the disc, said actuating element having counterweight means operative to normally maintain the element in position with its teeth in egg-engaging position.

2. An egg counter device for use in connection with a wire poultry cage having a sloping wire ramp providing the bottom of the cage and terminating in an egg gathering trough, comprising: a frame attachable to the wire ramp to be disposed at the underside thereof; a counter wheel rotatable on said frame on an axis extending transversely of the ramp, said wheel being disposed wholly beneath the ramp and having at its periphery ratchet teeth and graduation numbers denoting the number of eggs counted; an elongate actuating element pivoted on said frame on an axis extending parallel to said axis of said wheel, said element having integral fingers projecting upwardly through the wire ramp at intervals spaced transversely of the ramp, in position to be engaged and rocked by an egg rolling along the ramp; indexing pawl means pivotally connected to said actuating element and engageable successively with the teeth of the disc during oscillation of the element for intermittently rotating the latter through the circumferential distance of one tooth; a check pawl mounted on said frame and engageable successively with said ratchet teeth to prevent retrogressive movement of the disc, said actuating element having counterweight means operative to normally maintain the element in position with its teeth in egg-engaging position, said indexing pawl having an ear providing a pointer registrable with the graduations on said disc.

3. An egg counter device for use in connection with a wire poultry cage having a sloping wire ramp providing the bottom of the cage and terminating in an egg gathering trough, comprising: a frame attachable to the wire ramp to be disposed at the underside thereof; a counter wheel rotatable on said frame on an axis extending transversely of the ramp, said wheel being disposed wholly beneath the ramp and having at its periphery ratchet teeth and graduation numbers denoting the number of eggs counted; an elongate actuating element pivoted on said frame on an axis extending parallel to said axis of said wheel, said element having integral fingers projecting upwardly through the wire ramp at intervals spaced transversely of the ramp, in position to be engaged and rocked by an egg rolling along the ramp; indexing pawl means pivotally connected to said actuating element and engageable successively with the teeth of the disc during oscillation of the element for intermittently rotating the latter through the circumferential distance of one tooth; a check pawl mounted on said frame and engageable successively with said ratchet teeth to prevent retrogressive movement of the disc, said actuating element having counterweight means operative to normally maintain the element in position with its teeth in egg-engaging position, said indexing pawl having an ear providing a pointer registrable with the graduations on said disc, said check pawl consisting of a curved strip of spring metal having a free end engaging said ratchet teeth.

4. An egg counter device as defined in claim 3 in which said counter disc consists of a light-weight part of frusto-conical shape providing a tapered periphery, said graduations being on said tapered periphery.

5. An egg counter device as defined in claim 3 in which said actuator element consists of a light-weight part having a horizontal rod portion rotatable in bearings in the frame, and upstanding egg-engaging fingers projecting upwardly from the rod portion, said rod portion having a depending lug to which said indexing pawl is pivotally connected.

References Cited in the file of this patent

UNITED STATES PATENTS

| 2,195,702 | Kent | Apr. 2, 1940 |
| 2,305,708 | Jacobsen | Dec. 22, 1942 |
| 2,696,349 | Baumstark | Dec. 7, 1954 |